(12) United States Patent
Wünn et al.

(10) Patent No.: US 11,285,424 B2
(45) Date of Patent: Mar. 29, 2022

(54) SHEET MATERIAL AND FILTER ELEMENT WITH HYDROPHOBIC SEPARATING LAYER, USE THEREOF AND PROCESS FOR PRODUCTION OF SAME

(71) Applicant: Sartorius Stedim Biotech GmbH, Göttingen (DE)

(72) Inventors: Eberhard Wünn, Göttingen (DE); Thomas Friese, Bleicherode (DE); Benjamin Schneider, Göttingen (DE); Mario Strauss, Bad Lauterberg (DE)

(73) Assignee: Sartorius Stedim Biotech GmbH

( * ) Notice: Subject to any disclaimer, the term of this patent is extended or adjusted under 35 U.S.C. 154(b) by 319 days.

(21) Appl. No.: 16/395,164

(22) Filed: Apr. 25, 2019

(65) Prior Publication Data
US 2019/0329172 A1    Oct. 31, 2019

(30) Foreign Application Priority Data
Apr. 27, 2018  (DE) ...................... 10 2018 003 481.0

(51) Int. Cl.
*B01D 46/54* (2006.01)
*B01D 39/16* (2006.01)
*B32B 27/12* (2006.01)
*B32B 27/28* (2006.01)

(52) U.S. Cl.
CPC ....... *B01D 46/543* (2013.01); *B01D 39/1623* (2013.01); *B01D 39/1692* (2013.01); *B01D 2239/0208* (2013.01); *B01D 2239/0428* (2013.01); *B01D 2239/065* (2013.01); *B01D 2239/0618* (2013.01); *B32B 27/12* (2013.01); *B32B 27/286* (2013.01); *B32B 2307/73* (2013.01)

(58) Field of Classification Search
CPC .............. B01D 46/543; B01D 39/1623; B01D 39/1692; B01D 2239/0208; B01D 2239/0428; B01D 2239/0618; B01D 2239/065; B32B 27/12; B32B 2307/73
See application file for complete search history.

(56) References Cited

U.S. PATENT DOCUMENTS

| 3,976,572 | A | 8/1976 | Reick |
| 4,985,280 | A | 1/1991 | Scholz et al. |
| 2001/0040126 | A1 | 11/2001 | Chilibeck |
| 2006/0060085 | A1 | 3/2006 | Ptak et al. |
| 2010/0272941 | A1 | 10/2010 | Cherukupalli et al. |
| 2011/0041693 | A1* | 2/2011 | Hatfield ................ B01D 69/12 96/9 |
| 2014/0033665 | A1* | 2/2014 | Smithies .............. B01D 46/521 55/486 |
| 2015/0052865 | A1* | 2/2015 | Jackson ............... B01D 46/543 55/487 |

(Continued)

FOREIGN PATENT DOCUMENTS

| DE | 4234816 | 10/1993 |
| DE | 102010056148 | 1/2013 |

(Continued)

*Primary Examiner* — Robert Clemente
(74) *Attorney, Agent, or Firm* — Klarquist Sparkman, LLP

(57) ABSTRACT

The present invention relates to a sheet material and filter element, where the sheet material and the filter element have a hydrophobic separating layer, and also to use thereof and to a process for production of same.

9 Claims, 4 Drawing Sheets

(56) References Cited

U.S. PATENT DOCUMENTS

| | | | | |
|---|---|---|---|---|
| 2019/0224609 A1* | 7/2019 | Niki | ............... | B01D 39/1692 |
| 2019/0232211 A1* | 8/2019 | Niki | ............... | B32B 5/28 |
| 2020/0316532 A1* | 10/2020 | Morris | ............... | B01D 39/1692 |
| 2021/0146287 A1* | 5/2021 | Thompson | ............... | B01D 39/1623 |

FOREIGN PATENT DOCUMENTS

| | | |
|---|---|---|
| DE | 102011121018 | 6/2013 |
| DE | 102016013019 | 5/2018 |
| EP | 1618225 | 8/2001 |
| EP | 1432860 | 9/2005 |
| EP | 2015858 | 9/2011 |
| WO | WO2006/101992 | 9/2006 |
| WO | WO2012/129094 | 9/2012 |

\* cited by examiner

SHEET MATERIAL AND FILTER ELEMENT WITH HYDROPHOBIC SEPARATING LAYER, USE THEREOF AND PROCESS FOR PRODUCTION OF SAME

CROSS REFERENCE TO RELATED APPLICATIONS

The present application claims priority from German Patent Application No. 10 2018 003 481,0, filed Apr. 27, 2018, which is incorporated herein by reference.

The present invention relates to a sheet material and filter element, where the sheet material and the filter element have a hydrophobic separating layer, to a process for production of the sheet material, and also to a process for production of the filter element.

The prior art discloses filter elements comprising a sheet material which comprises porous membrane layers and separating layers or reinforcement layers, and also one or more anchoring elements into which the sheet material has been embedded. The sheet materials can have been pleated to give a tubular or star shape. The two ends of the sheet materials are embedded into end caps which function as anchoring elements. The embedment is usually achieved via immersion of the edge regions of the sheet material into the molten anchoring system. Separating layers used are usually nonwoven fabrics. In particular, separating layers of the prior art are spunbonded polyester nonwoven fabrics, for example spunbonded polyethylene terephthalate nonwoven fabrics, hereinafter termed spunbonded PET nonwoven fabrics, which can be used to construct gamma-sterilizable pleated filter elements. Spunbonded polyester nonwoven fabrics are gamma-resistant up to a radiation dose of about 1000 kGy. Use of polyolefin-based nonwoven fabrics is also known. The nonwoven serves for drainage and/or support, i.e. increases the stability of the pleated material and is permeable to fluids, thus forming, as it were, a channel permitting flow to the membrane.

Sterile filtration of gaseous fluids (for example by an air filter) usually uses hydrophobic filtration materials. In this connection it should be noted that sterile filtration of gaseous fluids can in principle also be achieved with hydrophilic membranes/separating layers. However, when these are in the presence of aqueous fluids which by way of example can take the form of moisture droplets (aerosol, mist) and finally of condensate on the surface of the filter, they can suffer from partial wetting or other effects restricting performance, for example in the form of reduced air flow. Preference is therefore given to hydrophobic filter materials, because these cannot be wetted by aqueous liquids.

When a filter element is used for the sterile filtration of gaseous fluids, it is moreover desirable that the filter element is WIT-testable. The abbreviation "WIT" means water intrusion test. In principle, WIT can be carried out only on a filter or sheet material with hydrophobic/hydrophobically modified layers.

In a WIT, one side of the sheet material is brought into contact with water, and pressure is applied to that side. It is desirable that the sheet material (or filter element into which the sheet material has been installed) withstands a certain pressure (for example 1.5 bar) without any penetration of water through the sheet material (or the filter element). The integrity of these sheet materials or filter elements can be checked by submitting them to a WIT before use.

In this connection, it has been discovered that the WIT substantially reduces, in some cases almost to zero, the air flow rate (AFR) through the sheet material/filter element. This phenomenon is observed in the case of air filters (sterile filters, membrane material usually polyvinylidene fluoride (PVDF), hydrophobic polyether sulfone (PESO) and/or polytetrafluoroethylene (PTFE), nonwoven material PP/PE or PET). The cause is presumably formation of a liquid film which is held in the separating layer. The water film reduces the AFR through the separating layer and therefore through the entire sheet material/filter element. This phenomenon is observed in the case of air filters in general, for example candle air filters that are gamma-irradiatable and candle air filters that are autoclavable.

In cases where bioreactors or disposable filtration devices are used, there is generally a requirement for introduction of, and withdrawal of, air. In order to protect the working environment and the operator from contaminated air, there is a sterilized air filter provided for sterile filtration for the withdrawal of air before the disposable filtration device is brought into operation. At the same time, the air filter is intended to ensure that no water and no aerosols can penetrate into the filtration device, and that sterility is maintained in the interior of the filtration device.

When a filter for gaseous fluids is provided in order to withdraw air, adequate protection should be provided thereto to prevent blocking of same. This can especially occur when an aqueous fluid comes into contact with the filter and blocks same. The term "blocking" here means that a fluid (for example an aqueous or other fluid) forms a film on a nonwoven fabric that supports the filter membrane. This can result in restriction, or complete prevention, of air flow.

The object underlying the present invention is therefore to provide a sheet material which on contact with a polar liquid, in particular water, suffers no lasting reduction of its permeability to gaseous fluids, in particular air, a filter element comprising the sheet material, and also processes for production of the sheet material and of the filter element.

This object is achieved via the embodiments characterized in the claims.

One aspect of the present invention provides a sheet material with at least one of the following layer A and at least one of the following layer B:

A: a hydrophobic porous membrane; and
B: a hydrophobically modified fibrous separating layer.

The separating layer B is fibrous, i.e. is composed of fibers. It is possible in the invention that the fibers, and/or the fibrous separating layer, has/have been post-treated, for example by coating and/or impregnation.

The fibrous separating layer B has been hydrophobically modified and is therefore hydrophobic.

A fibrous separating layer can be described as "hydrophobically modified" by way of example when the hydrophobically modified fibrous separating layer exhibits a contact angle increase $\Delta\Theta$, due to hydrophobic modification, of at least 10°, particularly preferably at least 15°, with particular preference at least 20°. The contact angle increase $\Delta\Theta$ due to hydrophobic (or oleophobic) modification is determined by measuring, with accuracy corresponding to one decimal point, the contact angle of the hydrophobically modified separating layer $\Theta_{mod}$ and the contact angle $\Theta_0$ of a corresponding separating layer which differs from the hydrophobically modified separating layer only in that it has not been hydrophobically modified. The contact angle increase $\Delta\Theta$ is the difference $\Theta_{mod}-\Theta_0$.

A "hydrophobic" or "hydrophobically modified" separating layer B is moreover also present when said layer has a surface with a contact angle of at least 120° in relation to water, preferably at least 130°, particularly preferably 140°.

The hydrophobicity of the fibrous separating layer B greatly reduces the wettability thereof by polar liquids, in particular water. The permeability of the sheet material of the invention to gaseous fluids, in particular to air, cannot therefore suffer lasting reduction due to contact with the polar liquid under pressure, in particular with water, for example in a WIT.

It is preferable that the fibrous separating layer B has been oleophobically modified. The meaning of "oleophobic" or "oleophobically modified" in the invention in relation to the separating layer B is that said layer has a surface with a contact angle of at least 145° in relation to water.

In one preferred embodiment, the reduction of air flow due to a WIT is at most 50%, preferably at most 40%, particularly preferably at most 35%. The above reduction of air flow is defined as the ratio "(average air flow before WIT—average air flow after WIT)/average air flow before WIT", where the maximal permitted period between the WIT and the measurement of average air flow after WIT is 1 hour without further treatment (e.g. drying). The average air flow is measured as described in the example.

In many cases, synthetic polymers have hydrophobic surface properties which can be attributed to the intrinsic hydrophobicity of the synthetic materials. Hydrophobicity is a material constant and determines, next to the surface structure of the material, the contact angle in relation to water. Hydrophobic materials have reduced wettability by aqueous and polar fluids, because their surface energy is lower than that of water. In the case of smooth, nonporous surfaces, the contact angle in relation to water is a measure of the surface energy. The higher the contact angle in relation to water, the higher the hydrophobicity. Hydrophobic substances are not water-miscible or water-wettable. The substances are mostly nonpolar, and their surface energy at 20° C. is below 72 mN/m. Oleophobic substances, which feature particularly high hydrophobicity, are not miscible with, or wettable by, oils and other nonpolar substances. Their surface energy at 20° C. is below 21 mN/m. Table 1 lists typical surface energies of polymers that are processed to give membranes, and their contact angles in relation to water.

TABLE 1

Surface energies of smooth, nonporous polymers and their contact angles in relation to water

| Polymer | Surface energy [mN/m] | Contact angle in relation to water [°] |
| --- | --- | --- |
| Polyamide (Nylon) | 75[a] | 49[a] |
| Polyether sulfone (PES) | 58[a] | 54[a] |
| Polyetheretherketone (PEEK) | 49[a] | 71[a] |
| Polyethylene (PE) | 31[b] | 94[b] |
| Polyvinylidene fluoride (PVDF) | 25[b] | 85[b] |
| Polytetrafluoroethylene (PTFE) | 18.5[b] | 108[b] |

[a]Membrane Science and Technology Series, 11, "Membrane Contactors: Fundamentals, Applications and Potentialities", 2005, E. Drioli et al.
[b]J. Appl. Polym. Sci., 1969, 13, 1741-1747, D. K. Owens et al.

Because of the fiber structure of the separating layer, there is no flat surface present. The fiber structure brings about a contact-angle- or hydrophobicity-increasing effect ("lotus effect"), in addition to the hydrophobicity of the fiber material. Contact angles for materials in fiber form are therefore expected to be higher than those stated in table 1.

The contact angle of the surface of the separating layer B in relation to water is preferably at least 140°, particularly preferably at least 145°, with particular preference at least 150'.

The contact angle defined for the purposes of the present invention is the static contact angle in degrees [°] in relation to pure water. This can be carried out by a method based on ASTM D5946-09 with a commercially available goniometer (e.g. "OCA 15 pro contact angle system" from DataPhysics), by applying one drop of ultrapure water (from 10 to 20 μL) to the surface to be analyzed and then using software for evaluation (e.g. SCA20 from DataPhysics). This software uses Laplace-Young fit to determine the contact angle.

Hydrophobic modification can be achieved in the present invention by means of fluorine-containing agents, for example monomeric, oligomeric or polymeric form. The hydrophobic modification can moreover take the form of a silicon-based compound or of an aliphatic hydrocarbon.

Suitable modification processes are known to the person skilled in the art. By way of example, a hydrophobic modification can be produced by immersing the unmodified separating layer into an impregnation solution and then drying said layer.

In one preferred embodiment of the present invention, the separating layer B is a nonwoven fabric, woven fabric, knitted fabric and/or mesh, preference being given to a nonwoven fabric, in particular a spunbonded nonwoven fabric. This embodiment can ensure particularly high dimensional stability of the separating layer B. It is preferable that the separating layer B is a nonwoven-fabric drainage layer.

The average air permeability of the separating layer B at a pressure of $1.25 \cdot 10^2$ Pa is preferably from 1500 to 6500 dm$^3$/m$^2$s, preferably from 2600 to 6200 dm$^3$/m$^2$s, particularly preferably from 1800 to 6000 dm$^3$/m$^2$s. The average air permeability can be determined as described below.

Determination of Average Air Permeability

The method uses 3 different punch-out test specimens of a material to be tested. An "FX 3300 LABOTESTER III" air permeability tester from TEXTEST INSTRUMENTS is used to measure the air permeability of each of the punched-out test specimens, the area of each of which is 20 cm$^2$. The same pressure difference is applied for each of the 3 measurements. The test provides 3 values (unit: l/m$^2$/min). The average air permeability is the arithmetic mean calculated from these 3 values.

In another preferred embodiment, the weight per unit area of the separating layer B is from 15 to 120 g/m$^2$, preferably from 20 to 110 g/m$^2$.

In one preferred embodiment, the separating layer B comprises polyester fibers, polyimide fibers and/or polyolefin fibers. An example of a suitable polyester is polyethylene terephthalate. Among suitable polyolefins are polyethylene and polypropylene.

In one particularly preferred embodiment, the separating layer B comprises core- and sheath polyolefin fibers. The sheath material is preferably polyethylene. Polyethylene features high resistance to radiation. Polyethylene moreover has a relatively low melting point. It is thus possible to ensure that, during the production of a filter element, when the sheet material of the invention is anchored in an anchoring element, the sheath material melts completely in the region of the anchoring element. Surprisingly, it has been found that melting of the sheath material of the core-and-sheath fibers causes shrinkage of the separating layer B, so that in the region of the anchoring elements the membrane layer A projects further than the separating layer B into the at least partially molten material of the anchoring elements. This leads to secure embedment, and indeed if there are a plurality of membrane layers A to intimate interlocking between the material of the anchoring element and the sheet material; this is a particularly successful method of eliminating bypasses in the region of the anchoring elements of the filter element. Elimination of bypasses is in particular essential in the production of sterile filters. It is preferable that the melting point of the core material of the core-and-sheath fibers is higher than that of the sheath material. It is thus possible to melt the sheath material without altering the structure of the porous separating layer (with the exception of the desired shrinkage effect).

A separating layer B comprising core-and-sheath fibers moreover allows non-aggressive, i.e. low-temperature, pleating of the sheet material; this is advantageous in particular when a hydrophobically modified membrane layer A and/or a hydrophobically modified separating layer B can be heat-sensitive.

The difference between the melting points of the sheath materials and core materials is preferably at least 5° C., particularly preferably at least 15° C., with particular preference at least 25° C. The difference is by way of example not more than 100° C., preferably 75° C., with particular preference not more than 50° C.

The core material is preferably polypropylene (PP), for example with melting point in the range 160° C.±10° C. The sheath material is preferably polyethylene (PE), for example with melting point in the range 135° C.±5° C., 120° C.±5° C. or 105° C.±5° C. It is preferable that the sheath material consists of at least one of LDPE (low-density polyethylene) and of HDPE (high-density polyethylene), or of a mixture thereof, particular preference being given here to HDPE.

It is moreover preferable that the core material is polypropylene (PP) with melting point in the range 160° C.±10° C., and/or that the sheath material is polyethylene (PE) with melting point in the range 112.5° C.±10° C. Particular preference is given to a combination of a core material which is polypropylene (PP) with melting point in the range 160° C.±5° C., with particular preference 160° C.±2° C., with a sheath material which is polyethylene (PE) with melting point in the range 112.5° C.±5° C., with particular preference 112.5° C.±2° C., most preferably 112.5° C.±1° C.

The melting point can be measured in the invention by means of a calorimeter with differential scanning. A "DSC 214 Polyma" colorimeter from Netzsch is by way of example suitable for this purpose.

The PP:PE (core polymer:sheath polymer) ratio by mass of the polymers in the core-and-sheath fibers can vary from 2:98 to 90:10, a preferred ratio here being from 30:70 to 70:30, in particular 40:60 to 60:40, for example 50:50.

In one preferred embodiment of the present invention, the core-and-sheath fibers have an approximately circular cross-sectional profile. It is particularly preferable that the core fiber also has an approximately circular cross-sectional profile.

The "diameter" in the invention means the greatest length dimension within the cross-sectional profile.

The diameter of the core-and-sheath fibers in the invention is preferably from 10 to 200 µm, particularly preferably from 25 to 100 µm, with particular preference from 30 to 50 µm. A point to be noted here is that if the diameter of the core-and-sheath fibers is large, for example from 25 to 200 µm, preferably from 30 to 200 µm, particularly preferably from 50 to 200 µm, with particular preference from 75 to 200 µm, it is possible in the invention to provide a separating layer B with low flow resistance or low air resistance, and therefore with high air flow rate. It is therefore possible to use a large diameter of the core-and-sheath fibers to reduce the flow resistance of the separating layer B; a corresponding sheet material of the invention is therefore particularly suitable for air filtration.

The diameter of the core fibers without sheath is preferably from 1 to 190 µm, particularly preferably from 2 to 100 µm, with particular preference from 5 to 45 µm.

The thickness of the sheath is preferably from 1 to 150 µm, preferably from 2 to 75 µm, with particular preference from 5 to 15 µm. The expression "thickness of the sheath" means the greatest length dimension measured from the boundary between core and sheath to the exterior surface of the core-and-sheath fiber, perpendicularly to the boundary between core and sheath.

The shrinkage of the core-and-sheath nonwoven fabric B after autoclaving at a temperature of 121° C. for a period of 30 minutes is at least 2%, preferably at least 4%, with particular preference at least 5%. The shrinkage is calculated from the following equation:

Shrinkage [%]=100%·(1−(length of separating layer B after autoclaving/length of separating layer B before autoclaving)

The shrinkage of the core-and-sheath nonwoven fabric B due to heating to 130° C. (which differs from the shrinkage due to autoclaving) is moreover preferably at most 1.5%, preferably at most 1.0%. It is moreover preferable that the shrinkage of the core-and-sheath nonwoven fabric B due to heating to 140° C. (which differs from the shrinkage due to autoclaving) is at most 2.5%, preferably at most 2%. The preceding values can in particular be kept small if the core-and-sheath nonwoven fabric B comprises a polyolefin material (for example polyethylene-polypropylene core-and-sheath fibers).

Shrinkage due to heating to 130° C. and shrinkage due to heating to 140° C. can be determined as follows.
Shrinkage Due to Heating to 130° C. and Shrinkage Due to Heating to 140° C.

A circular punched-out specimen (diameter 142 mm) is placed for 10 seconds onto a heating plate with a temperature of 130° C. and, respectively, 140° C. The shrinkage due to heating is the percentage diameter reduction, based on the original diameter of the punched-out specimen.

In one preferred embodiment of the present invention, the thickness of the separating layer B is at least 80 µm, preferably at least 100 µm, with particular preference at least 120 µm. Thicknesses in this range can provide a sheet material of the invention with high mechanical strength and high stiffness. High stiffness of the sheet material is in particular advantageous for the production of the filter element of the invention, in particular when single-layer sheet materials with only one membrane layer A are used. A point requiring consideration here is that greater thickness of the separating layer B should be accompanied by a greater diameter of the fibers of the fibrous separating layer B.

The upper thickness limit is not subject to any particular restriction, but a thickness of 700 µm, preferably 600 µm, with particular preference 500 µm, should not be exceeded.

The layer A in the present invention is a hydrophobic porous membrane. The meaning of "hydrophobic" in the invention in relation to the membrane layer A is that it has a surface with a contact angle of more than 90° in relation to water.

In one preferred embodiment of the present invention, the hydrophobic porous membrane layer A is intrinsically hydrophobic and/or has been hydrophobically modified; it is particularly preferable here that the hydrophobic porous membrane layer A has been hydrophobically modified.

An intrinsically hydrophobic porous membrane layer A in the invention is composed of a hydrophobic material. In one preferred embodiment of the present invention, the porous membrane is composed of a polymer selected from the group consisting of polyether sulfone, polyvinylidene fluoride, polytetrafluoroethylene and polyolefins (e.g. polyethylene), and also mixtures thereof. It is particularly preferable that the porous membrane is composed of polyether sulfone.

Hydrophobic modification can be achieved in the invention by means of fluorine-containing agents, for example monomeric, oligomeric or polymeric form. Suitable modification processes are known to the person skilled in the art. By way of example, the membrane described in DE 10 2011 121 018 A1 can be used as hydrophobically modified membrane.

In one preferred embodiment, the hydrophobic porous membrane layer A has been oleophobically modified.

In one preferred embodiment, the average pore size of the porous membrane is from 0.005 to 10 µm, preferably from 0.1 to 1.2 µm, more preferably from 0.2 to 0.65 µm.

Porous membranes can be classified on the basis of their pore sizes: a distinction is generally drawn on the basis of pore size between microfiltration membranes (average pore size: from 0.1 to 10 µm), ultrafiltration membranes (average pore size: from 0.01 to less than 0.1 µm) and nanofiltration membranes (average pore size: from 0.001 to less than 0.01 µm) (see Shang-Tian Yang, Bioprocessing for Value-Added Products from Renewable Resources, 2007).

Average pore size is by way of example determined as described below.

Method for Determination of Average Pore Size

Various methods are used, as required by the pore size to be determined. In the field of microfiltration, the method mainly used is capillary flow porometry. Capillary flow porometry is gas/liquid porosimetry in which the differential gas pressures and flow rates through a membrane sample are measured first in the moist state and then in the dry state.

Before the measurement, the membrane sample is brought into contact with wetting liquid in a manner such that said liquid fills all the available pores. After filling of pores and introduction of the sample, the measurement cell is sealed and the measurement is initiated. After initiation of the measurement, the gas pressure is automatically increased stepwise, and the gas pressure removes the liquid from the pores of diameter corresponding to the prevailing pressure. This procedure is continued until the relevant pore range has been covered, i.e. until even the smallest pores present within the range of measurement have been freed from the liquid. This system is then depressurized, and measurement is automatically repeated on the sample, which is now dried. The pore size distribution is calculated by way of the Young-Laplace equation from the difference between the two pressure-flow-rate curves. (See Shrestha, Aabhash, "Characterization of porous membranes via porometry" (2012), Mechanical Engineering Graduate Theses & Dissertations, Paper 38.)

In the case of ultra- and nanofiltration membranes, gas/liquid porosimetry cannot be used to characterize the pore size distribution, because the diameter of the pores in these membranes is significantly smaller. According to the Laplace equation, the pressure required to displace the wetting liquid rises to orders of magnitude up to 50-70 bar, depending on surface tension. Firstly, such pressures are more difficult to handle and are sometimes subject to limits imposed by apparatus-related parameters; secondly, the pressures exerted on the membrane and the resultant forces are likely to alter the structure, and in extreme cases to cause loss of structural integrity. The physical properties thus obtained in relation to pore size distribution would not correspond to those of an intact membrane. In order to achieve characterization despite the above, it is desirable to reduce the surface tension or interfacial tension of the wetting and displacing fluids. Liquid-liquid displacement involving two immiscible liquids is therefore used. The interfacial tension between said two fluids is significantly smaller than the surface tension between a gas and a liquid. Analogously to gas/liquid porosimetry, the displacement of one liquid by another is subject to the Laplace relationship, and a similar measurement method can be used, the difference being that recording of gas flow rates is replaced by recording of flow rates of the displacing liquid as a function of differential pressure increase. (See R. Davila, Characterization of Ultra and Nanofiltration commercial Filters by Liquid-Liquid Displacement Porosimetry, 2013.)

The arrangement of the layers A and B is not subject to any particular restriction. Sheet materials of the invention can have an exclusively alternating layer sequence (ABA-BAB etc.), or else layer sequences in which two or more layers of the same type follow one another (an example being AAB or BBA). It is preferable in the sheet material of the invention that adjacent layers are directly adjacent. This means that there are no other layers inserted between adjacent layers, and that adjacent layers are in contact with one another. It is moreover preferable that each of the two exterior layers of the sheet material is a layer B. The sheet material of the invention particularly preferably consists of alternating layers with two layers B as outermost layers, the layer sequence therefore being B(AB)n, where n is an integer.

In one preferred embodiment of the present invention, the sheet material consists of the layer sequence BAB; i.e. n=1 in the preceding preferred layer sequence B(AB)n. This type of sheet material is termed "single-layer", where this terminology is based on the number of membrane layers A: by way of example, a sheet material with two membrane layers A is termed two-layer. The single-layer sheet material of the invention made of the layer sequence BAB is particularly suitable for filtration of solutions and gases. The sheet material is particularly suitable for filtration of solutions with solvents that wet hydrophobic membranes, e.g. nonpolar solvents. The single-layer sheet material is in particular suitable for sterile filtration of air.

In another preferred embodiment, the sheet material of the invention has two successive membrane layers A. The two membrane layers are particularly preferably two different porous membranes $A_1$ and $A_2$, e.g. a prefilter and a main filter. $A_1$ and $A_2$ differ from one another by way of example in their pore size. The sheet material particularly preferably consists of the layer sequence B(AAB)n, where n is an integer and is preferably 1.

Insofar as a plurality of separating layers are present, these can be of the same type or different. The separating layer(s) can moreover be present only on one side of the membrane layer A, or on both sides.

It is possible in the present invention that the layers A and B are in contact with one another without any secure connection to one another. Alternatively, there can be a physical and/or chemical bond between directly adjacent layers, fixing the separating layer B to the membrane layer A. The physical and/or chemical bond can by way of example result from a lamination procedure using known devices, or else from exposure to pressure and heat during the further processing of the sheet material of the invention.

In order to achieve maximal flow rate, in particular in the case of candle filters, it is preferable that the layers A and B are in contact with one another without any fixed connection to one another. In other words, the layers A and B can merely be in contact, without a fixed connection to one another. A physical/chemical bond (for example through lamination) can seal the surface-pores of the membrane; this can impair filter properties. Furthermore, production of this type of bond incurs considerable cost. The further processing (for example pleating/folding) of a laminated sheet material can moreover lead to defects in the membrane layer A. By way of example, it is possible that fiber ends of the separating layer B in a lamination sheet material penetrate into the membrane layer A, thus producing defects in the form of pinholes. Contact between A and B without any fixed connection is therefore advantageous in particular in respect of filtration performance.

In one preferred embodiment, the sheet material consists of gamma-sterilizable materials. Accordingly, the radiation resistance of the sheet material of the invention is preferably at least 20 kGy, particularly preferably at least 50 kGy, with particular preference at least 100 kGy. The radiation resistance of the sheet material of the invention is not subject to any upward restriction, but is preferably at most 500 kGy, particularly preferably at most 200 kGy. The meaning of "radiation resistance of X kGy" in the invention is that the loss of strength in the sheet material after gamma irradiation with a dose of X kGy is at most 30%; (X can assume any desired value, being by way of example 20 kGy, 50 kGy, 100 kGy or 500 kGy). The loss of strength here results from the decrease of the value for strength of the sheet material after gamma irradiation of a dose of X kGy, based on the value of the strength of the sheet material before gamma irradiation with said dose. If the value for the strength of the irradiated sheet material is 80% of the value for the strength of the unirradiated sheet material, the loss of strength in the invention is 20%. The values for the strength of the irradiated and unirradiated sheet materials are described for the purpose of the present invention via their maximal tensile force values $F_{max}$ at room temperature. $F_{max}$ is determined for this purpose by cutting a sample of the sheet material to size with the dimensions 20 mm×150 mm and clamping same horizontally into a "Z2.5/TN1S" materials-testing machine from Zwick GmbH in a manner such that the free sample length between the clamping jaws is 4 cm. The "KAP-Z 200N" force transducer (A.S.T., D-01287 Dresden) is moved at a velocity of, for example, 5 cm/min. The measured data are continuously recorded and visualized by "testXpert" (Zwick GmbH, D-89079 Ulm) software associated with the device. $F_{max}$ is determined as average value of three irradiated samples of the sheet material and, respectively, three unirradiated samples. By virtue of the radiation resistance of the sheet material of the invention, there is no requirement to autoclave the sheet material, or the filter element of the invention formed therefrom, for the purpose of sterilization; instead, it can be sterilized by high-energy radiation, for example by gamma radiation, for example for the use for the sterile filtration of gaseous fluids, in particular for the sterile filtration of air.

Irradiation is a physical procedure which takes place at room temperature. The sterilizing (germ-destroying) effect of the high-energy radiation is based on cleavage of bonds within the organic material through which the gamma irradiation has penetrated.

Organic polymers differ in the manner in which they are adversely affected by high-energy radiation. In particular, polytetrafluoroethylene (PTFE), polypropylene (PP) and polyvinyl chloride (PVC) undergo a drastic reduction of mechanical stability, whereas aromatic polymers such as poly(ether)sulfones (polysulfone (PSU), polyether sulfone (PES)) and polyimides (PI) exhibit only slight changes. Moderate tolerance to gamma radiation is exhibited by, for example, polyethylene (PE), polyester (PET) and polyvinylidene fluoride (PVDF) (cf. table 2).

TABLE 2

| Plastic | Softening/melting point (° C.) | Resistance range (kGy) |
| --- | --- | --- |
| PTFE | 350 | 5 |
| POM | 175 | 15 |
| PP | 155 | 20 |
| PVC | 79 | 50 |
| PA 6.6 | 250 | 50 |
| PMMA | 105 | 100 |
| PE | 125 | 500 |
| PVDF | 175 | 1000 |
| PC | 148 | 1000 |
| PET | 250 | 1000 |
| PEEK | 340 | 10000 |
| PI | >230 | 10000 |
| PSU | 190 | 10000 |
| PES | 225 | 10000 |

In another preferred embodiment of the present invention, the sheet material has been pleated. It is particularly preferable that the sheet material has been pleated; the pleats here have various pleat heights, as described by way of example in DE 10 2010 056 148 B4. By virtue of the specific properties of the porous separating layer, the sheet material of the invention has excellent thermoplastic deformability. It is thus possible, by use of heat and mechanical force, to achieve a stable pleated composite which is only amenable to deformation with difficulty perpendicularly to the pleating (no "concertina effect"). This high stability moreover facilitates the anchoring of the pleated sheet material (or "pleated material") in an anchoring element in the process of the invention for production of a filter element.

Another aspect of the present invention provides a process for the production of the sheet material of the invention, comprising the steps of (1) provision of the at least one hydrophobic porous membrane A;

(2) provision of the at least one hydrophobically modified fibrous separating layer B;

(3) arrangement of the at least one porous membrane A and of the at least one hydrophobically modified fibrous separating layer B to give the sheet material.

What has been said above in relation to the sheet material of the invention applies correspondingly to the process for production thereof. Equally, what is said below in relation to the production processes applies in identical manner to the sheet material and, respectively, filter element obtained therefrom.

In one preferred embodiment of the present invention, step (2) encompasses the steps of (2-1) provision of a fibrous separating layer B';

(2-2) hydrophobic modification of the fibrous separating layer B' with formation of the hydrophobically modified fibrous separating layer B with hydrophobic modification.

What has been said in relation to the hydrophobic fibrous separating layer B applies, insofar as applicable, to the fibrous separating layer B'. The hydrophobically modified separating layer B can be obtained by hydrophobic modification from the separating layer B'.

The separating layer B' in step (2-1) can be provided in the form of a roll, for example as roll of woven fabric or of nonwoven fabric.

Step (2-2) preferably comprises a step of bringing the separating layer B' into contact with an impregnation composition, followed by a drying step. The impregnation composition preferably takes the form of liquid, for example of impregnation solution. Suitable impregnation compositions are known to the person skilled in the art.

An impregnation composition usually comprises an organic compound (for example in polymeric, monomeric or oligomeric form) which comprises a hydrophobic group (e.g. completely fluorinated (perfluorinated), partially fluorinated (polyfluorinated), silicon-based (alkylsilanes, silanes, polysiloxanes), and aliphatic hydrocarbon compounds). The organic compound can have been emulsified or dissolved. Insofar as the impregnation composition takes the form of emulsion, it can take the form of aqueous emulsion which optionally comprises at least one emulsifier. Insofar as the impregnation composition takes the form of solution, it is possible to use an organic, preferably polar, solvent (e.g. isopropyl acetate, hexane, and alcohols and mixtures thereof).

The impregnation system preferably takes the form of a coating formed by a fluorine-containing organic compound on the surface of the fibers of the fibrous separating layer B. For the stability of the impregnation system, the fluorine-containing organic compound has particularly advantageously been fixed to the fibers, for example through thermal or radiation-induced crosslinking of the monomeric, oligomeric or polymeric fluorine-containing compound. Among the suitable fluorine-containing organic compounds in the invention are preferably polymeric compounds having polyfluorinated or preferably perfluorinated pendant chains having from 4 to 10, preferably from 5 to 8, with particular preference 6, carbon atoms. The surfaces of the fiber material of the separating layer B can be impregnated via chemical reaction (crosslinking), for example in the drying step described below. An example of an impregnation composition with which it is possible to produce an impregnated surface of the above type is Nuva 2214 fl from Archroma.

The impregnation time is not subject to any particular restriction, and is preferably from 1 second to 10 minutes, particularly preferably from 10 seconds to 5 minutes, with particular preference from 30 seconds to 3 minutes.

As mentioned above, the impregnation composition can also comprise, alongside the abovementioned fluorine-containing organic compound, other constituents, for example one or more solvents (e.g. water or organic solvents), and also auxiliaries.

In the drying step, the separating layer B' with the impregnation composition is preferably heated to a temperature of from 40 to 200° C., particularly from 50 to 150° C., with particular preference from 80 to 120° C., in order to remove any solvent(s) that may be present in the impregnation composition. Drying usually continues until the separating layer with the impregnation composition is dry, i.e. until any solvents) present in the impregnation composition has/have been completely removed. It is preferable moreover that the crosslinking of the fluorine-containing compound, as described above, takes place during the drying step. The duration of the drying step is preferably from 1 to 60 minutes, in particular from 2 to 30 minutes. With appropriately selected temperature and duration, it is possible to avoid undesired structural alterations of the separating layer B' due to the effect of heat, while achieving adequate stability of the hydrophobic impregnation system.

In another preferred embodiment, the drying comprises at least one predrying step and at least one main drying step; the drying here takes place in a lower temperature range in the predrying step than in the main drying step.

The hydrophobic fibrous separating layer B is obtained from the separating layer B' via the drying step. Insofar as the separating layer B' took the form of a roll, the hydrophobic fibrous separating layer B obtained after the main drying step can again be rolled up to give a roll.

In another embodiment, a step (4) of lamination of the layer A onto the layer B follows step (3). Suitable lamination processes are known to the person skilled in the art and are disclosed by way of example in DE-C1 42 34 816, as mentioned above.

A step (5) of pleating of the sheet material can follow step (3) or step (4). Suitable pleating processes are known to the person skilled in the art. Pleating preferably takes place at a temperature of from 70 to 110° C. Within this low temperature range, the sheet material is not exposed to aggressive conditions; this is advantageous in particular for hydrophobically modified membrane layers A. and also for the hydrophobically modified separating layer B.

Another aspect of the present invention provides a filter element comprising the sheet material of the invention and at least one anchoring element, where the edge regions of the porous membrane A have been embedded in fluid-tight manner into the anchoring element. Fluid-tight embedding can in particular be ensured when the edge regions of the sheet material comprising at least the layers A and B has been embedded into the anchoring element. The fluid-tight embedding eliminates bypasses in the region of the anchoring elements, as explained above. By virtue of the fluid-tight anchoring, the filter element is in particular suitable for sterile filtration, especially for the sterile filtration of air.

It is moreover preferable that the BCT value of the filter element of the invention in accordance with ASTM F838-15 is 0 CFU. "CFU" is the acronym for "colony-forming units".

In one preferred embodiment, filter elements with a minimum filter area of 0.15 $m^2$ are WIT-testable; ("WIT" stands for "water-intrusion test"). The WIT value depends on the filter area and on the layer sequence. "WIT-testable" means that by way of example a filter element using a single-layer sheet material with the layer sequence BAB, where A is a hydrophobically modified polyether sulfone membrane, and with a filter area of 0.17 $m^2$ has a WIT value of at most 5 ml/10 min, preferably at most 4 ml/10 min, with particular preference at most 3 ml/10 min, for example 0.3 ml/10 min or less. For a filter area of 0.34 $m^2$ and otherwise identical conditions, "WIT-testable" means that the WIT value is at most 6.5 ml/10 min, preferably at most 5.5 ml/10 min, particularly preferably at most 4.5 ml/10 min and with particular preference at most 0.45 ml/10 min, and for a filter area of 0.53 $m^2$ and otherwise identical conditions at most 8 ml/10 min, preferably at most 7 ml/10 min, particularly preferably at most 6 ml/10 min and with particular preference at most 2.6 ml/10 min. The method for determination of the WIT value is stated in the examples.

The shape of the sheet material, in particular in the filter element of the invention, is not subject to any particular restriction. The sheet material can have been pleated to give a star shape or a tubular shape, for example filter capsules, candle filters or tube modules, or else can be substantially flat, as is the case by way of example for disposables. For production of the tubular shape it is necessary to weld the membrane and the separating layer(s) along two opposite sides.

The anchoring element preferably comprises a thermoplastic polymer material in the embedment region; it is particularly preferable that the anchoring element consists of a thermoplastic polymer material. It is thus possible to achieve particularly stable and fluid-tight embedment/anchoring through melting of the thermoplastic polymer material in the embedment region and subsequent placing of the anchoring element onto the sheet material.

In a preferred embodiment of the present invention, the filter element has two anchoring elements, the anchoring elements here being end caps of a tubular filter element. It is preferable here that the sheet material has been pleated to give a star shape. The anchoring elements are usually attached at opposite open sides of the sheet material pleated to give a star shape.

In another preferred embodiment, the filter element comprises a backpressure safeguard system and a core. The person skilled in the art will select a suitable backpressure safeguard system and a suitable core, as required by the intended use. In the case of a tubular shape described here, the backpressure safeguard system and the core are introduced onto or into the tubular sheet material before the embedment of the sheet material into the at least one anchoring element around the tubular sheet material.

In another embodiment, it is preferable that the layers A and B within the filtration element are not horizontal, but instead are vertical (with respect to gravitational force) or oblique. This arrangement is advantageous because the action of gravitational force can assist removal of any water/aqueous liquid that may be present.

In one preferred embodiment of the present invention, the filter element is an air filter. Insofar as the sheet material of the invention comprises a separating layer B composed of hydrophobically modified polyolefin core-and-sheath fibers, it is particularly suitable for the filtration of air.

Another aspect of the present invention provides a process for the production of the filter element of the invention, comprising the steps of:
(I) provision of the sheet material of the present invention;
(II) provision of the at least one anchoring element;
(III) fluid-tight embedding of the edge regions of the porous membrane A into the at least one anchoring element.

Suitable processes for fluid-tight embedment are known to the person skilled in the art. By way of example, insofar as the anchoring element comprises a thermoplastic polymer material in the embedment region, it can be melted by heating in the embedment region; in a following step, the anchoring element can be placed onto the edge region of the sheet material. Accordingly, in one preferred embodiment of the present invention the step (III) comprises the steps of
(IIIa) melting of the thermoplastic polymer material that the anchoring element comprises in the embedment region; and
(IIIb) placing the anchoring element onto the edge region of the sheet material.

The temperature of the molten thermoplastic polymer material during step (IIIb) is preferably from 180 to 600° C., particularly preferably from 200 to 400° C., with particular preference from 220 to 300° C. The use of temperatures within this low range avoids any excessive thermal effect on the sheet material. Undesired changes in particular of the membrane layer A are thus avoided. Especially when a hydrophobically modified membrane layer A and/or a hydrophobically modified separating layer B is/are used, an excessively high temperature of the thermoplastic material can be detrimental to the hydrophobic modification; this can restrict the ability of the filter element to perform as air filter, by reducing the hydrophobicity provided by the modification.

Another aspect of the present invention provides the use of the sheet material of the invention, or of the filter element of the invention, for the sterile filtration of air.

The following non-restricting example provides further explanation of the present invention.

EXAMPLE

Various filter units of the present invention and of the prior art (pleated candle filters with two end caps and filter housing, and specifically a filter capsule whose structure is shown in FIG. 1) were studied in the experiments described below.

Method for Measurement of Average Air Flow Rate

The measurement is made on the filter capsule. A pressure regulator at the ingoing end/upstream end is used to set a predetermined pressure difference Δp (between ingoing and outgoing end of the filter capsule housing). An air flow rate meter (attached on the outflow side or at the outgoing end of the housing) is used to determine the air flow rate (average air flow rate, average value of 3 measurements).

Conditions for Water Intrusion Test (WIT)

Water is charged to the upstream end of the filter housing. A pressure of 1.5 bar is then applied to the system and stabilized for 10 min. Intrusion of the water into the first layer of the membrane takes place during the test time of 10 min. The pressure drop is measured. The WIT value, as measure of water intrusion, is calculated from the pressure drop, the known test time, and the measured volume of water required to compensate the pressure drop. The measurement device used for the test is a Sartocheck 4 from Sartorius Stedim Biotech GmbH.

The hydrophobically modified membrane used was a membrane as described in DE 10 2011 121 018 A1 (hydrophobic PESU, average pore size 0.2 μm, thickness 120 μm).

The candle filters of the invention that were studied were installed as capsules with installed height 9 and had the layer sequence BAB (PP/PE nonwoven core-and-sheath fabric*// hydrophobically modified membrane//PP/PE nonwoven core-and-sheath fabric*). "*" here means that the PP/PE nonwoven core-and-sheath fabric comprised a hydrophobic modification obtained as follows. The filter area was 0.182 m².

For the hydrophobic modification procedure, a roll of fiber material was unwound and passed at room temperature through an impregnation bath comprising a mixture of 20% of NUVA 3049 fl. (Archroma GmbH) and 80% of water (impregnation time 1 min). The wetted web was then passed through a drying oven (110° C., convection 3 min) in order to remove the solvent, and wound up when dry.

Candle filters having the same structure but having separating layers without hydrophobic impregnation were used as comparative example.

AFR before WIT was first determined as described above. Each of the capsules was then subjected as described above to a WIT, and AFR was again determined immediately thereafter. In another series of tests, each of the capsules was subjected to a WIT and allowed to stand for one hour (25° C., 1013 hPa), and AFR was again determined. FIGS. 2 to 4 show the results.

Figure 1:
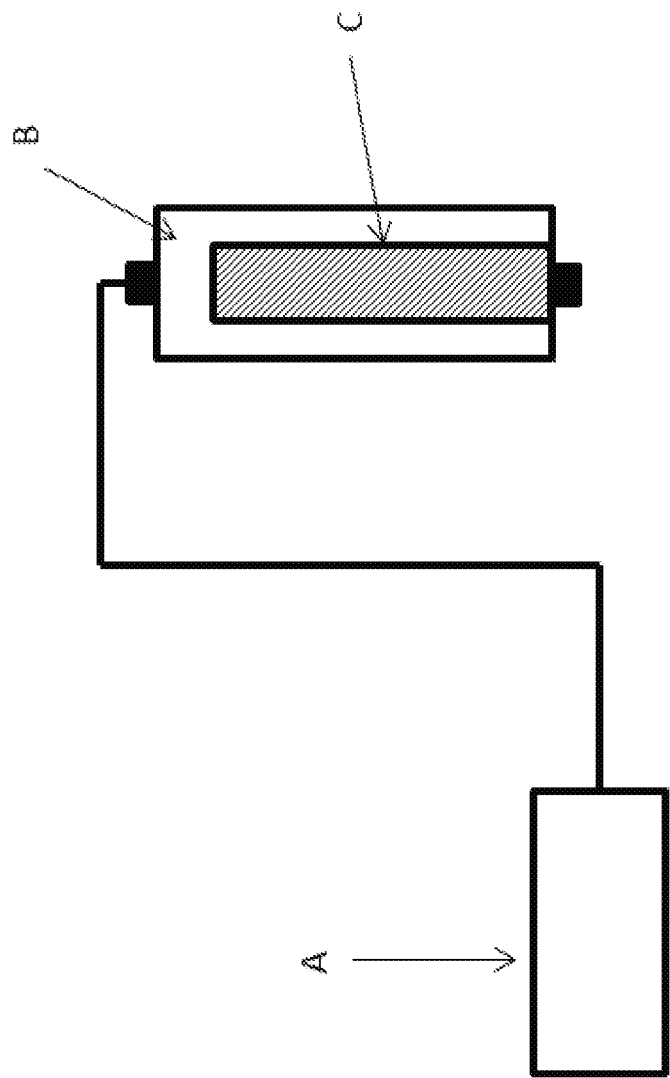
FIG. 1 is a diagram of the experimental setup of example 1 (water intrusion test with compressed air), where A indicates a measurement device (Sartocheck 4 from Sartorius Stedim Biotech GmbH) and C indicates a setup with pleated candle filter with two end caps and filter housing B.
Figure 2:
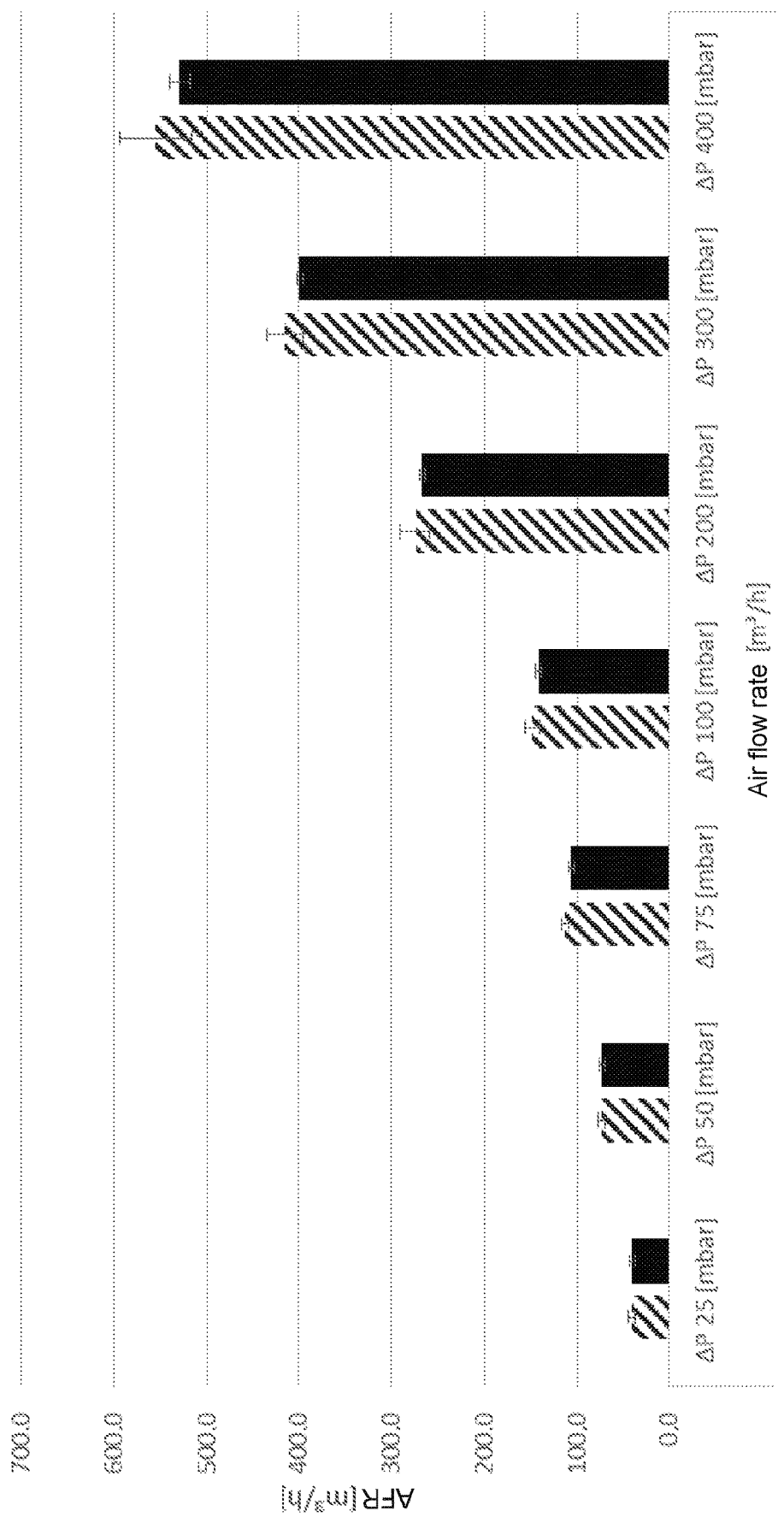
FIG. 2 shows the AFR, based on 1 m² of filter area, for comparative capsules (in each case on the left) and capsules of the invention (in each case on the right) before a WIT. Within the bounds of accuracy of measurement, no difference in AFR between the different types of capsule (with and without hydrophobic impregnation) is observed.
Figure 3:
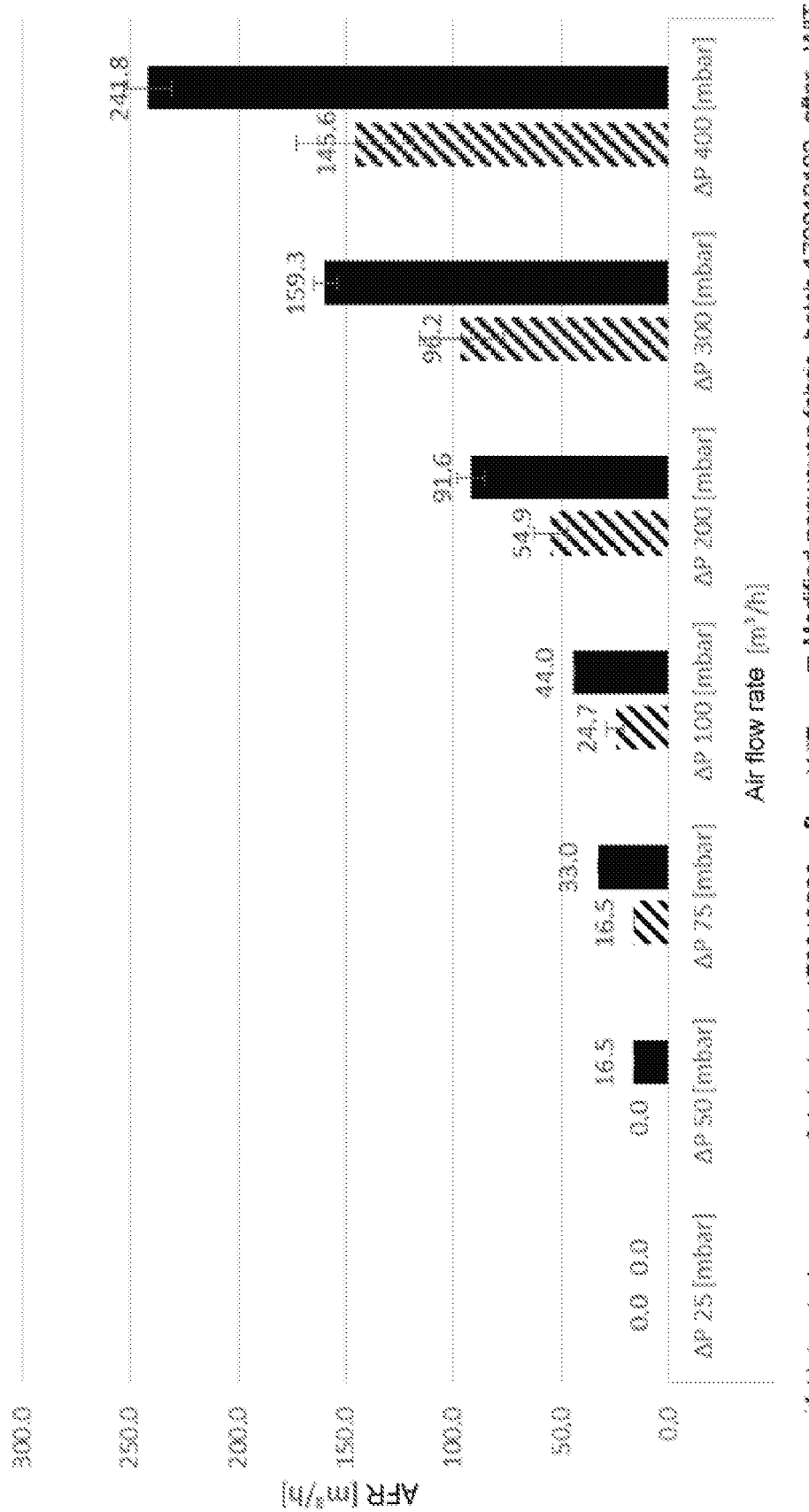
FIG. 3 shows AFR, based on 1 m² of filter area, for comparative capsules (in each case on the left) and capsules of the invention (in each case on the right) immediately after a WIT. The AFR reduction due to WIT is much greater for the comparative capsules than for the capsules of the invention.
Figure 4:
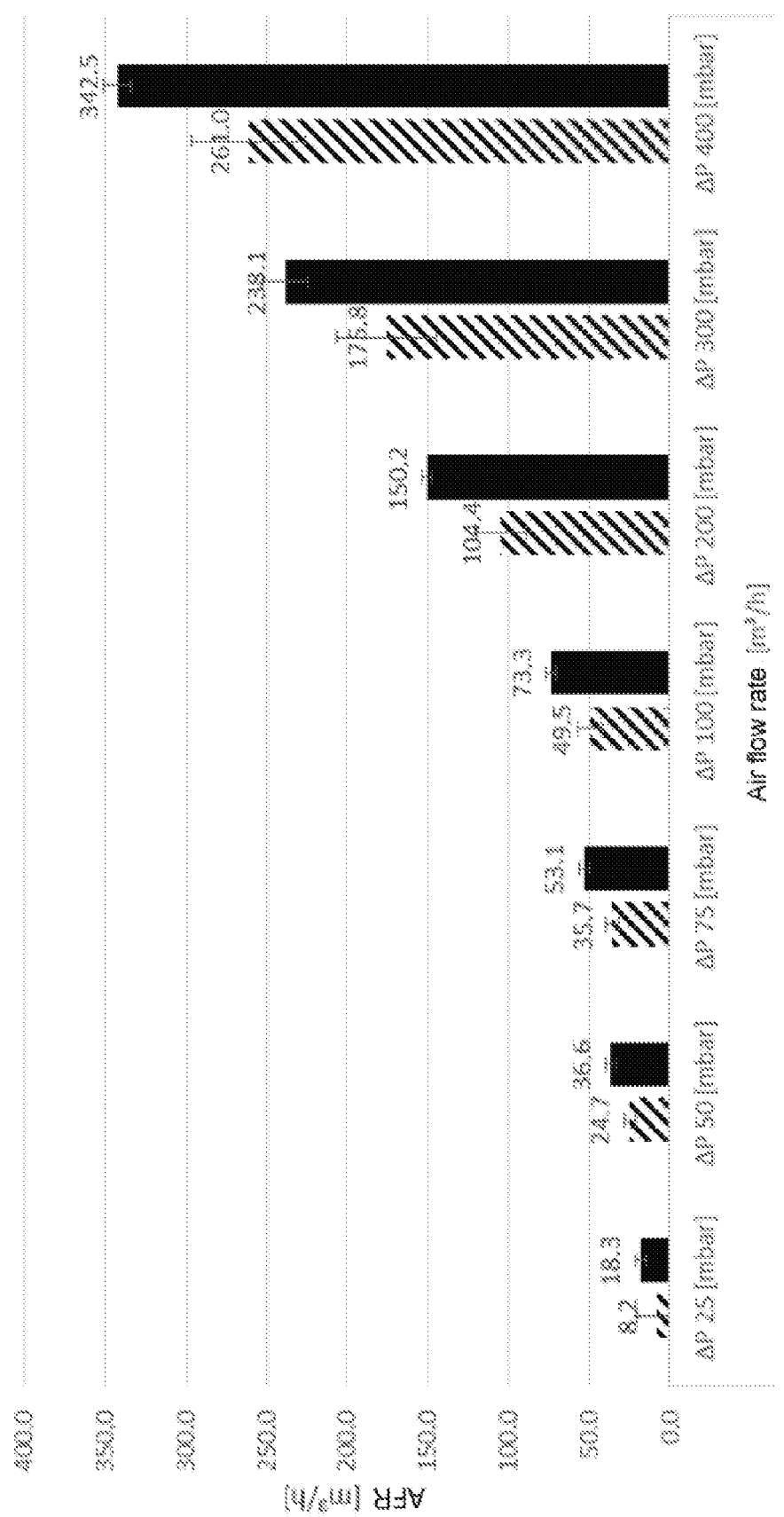
FIG. 4 shows AFR, based on 1 m² of filter area, for comparative capsules (in each case on the left) and capsules of the invention (in each case on the right) one hour after a WIT. It can clearly be seen that one hour after the WIT the capsules of the invention exhibit significantly higher AFR than conventional capsules of the prior art.

The present invention provides sheet materials which can be used to produce improved filter units. Because a hydrophobic fibrous separating layer is used, high air flow rate through the sheet material is obtained, even after contact with water under pressure, for example in the context of a WIT.

The invention claimed is:

1. A sheet material with at least one of the following layer A and at least one of the following layer B:
   A: a hydrophobic porous membrane; and
   B: a hydrophobically modified fibrous separating layer,
   wherein the at least one hydrophobic porous membrane A and the at least one hydrophobically modified fibrous separating layer B are in contact with one another without any fixed connection to one another.

2. The sheet material as claimed in claim 1,
   wherein the at least one hydrophobically modified fibrous separating layer B has a hydrophobic modification with a fluorine-containing compound, with a silicon-containing compound and/or with an aliphatic hydrocarbon.

3. The sheet material as claimed in claim 1,
   wherein the at least one hydrophobically modified fibrous separating layer B is a nonwoven-fabric drainage layer.

4. The sheet material as claimed in claim 1,
   wherein the at least one hydrophobically modified fibrous separating layer B consists of polyester fibers, polyimide fibers and/or polyolefin fibers with hydrophobic modification.

5. The sheet material as claimed in claim 1, which consists of gamma-sterilizable materials.

6. A process for the production of the sheet material as claimed in claim 1, comprising:
   (1) provision of the at least one hydrophobic porous membrane A;
   (2) provision of the at least one hydrophobically modified fibrous separating layer B;
   (3) arrangement of the at least one hydrophobic porous membrane A and of the at least one hydrophobic fibrous separating layer B to give the sheet material such that the at least one hydrophobic porous membrane A and the at least one hydrophobically modified fibrous separating layer B are in contact with one another without any fixed connection to one another.

7. A filter element comprising:
   the sheet material of claim 1 and at least one anchoring element,
   wherein the edge regions of the at least one hydrophobic porous membrane A have been embedded in fluid-tight manner into the anchoring element.

8. The filter element as claimed in claim 7, which is an air filter.

9. A process for the production of the filter element of claim 7, comprising:
   (I) provision of the sheet material of claim 1;
   (II) provision of the at least one anchoring element;
   (III) fluid-tight embedding of the edge regions of the at least one hydrophobic porous membrane A into the at least one anchoring element.

* * * * *